United States Patent [19]

Brechbühler et al.

[11] 3,725,418

[45] Apr. 3, 1973

[54] 1-PIPERIDINE-1-CYANO-O-CARBAMOYL-FORMOXIMES

[75] Inventors: Hans Ulrich Brechbühler, Basel; Kurt Gubler, Riehen, both of Switzerland

[73] Assignee: Geigy Chemical Corporation, Ardsley, N.Y.

[22] Filed: Apr. 13, 1972

[21] Appl. No.: 243,847

Related U.S. Application Data

[62] Division of Ser. No. 844,163, July 23, 1969, Pat. No. 3,673,236.

[30] Foreign Application Priority Data

July 24, 1968 Switzerland..........................11105/68

[52] U.S. Cl.............................................260/293.86
[51] Int. Cl.............................................C07d 29/32
[58] Field of Search.................................260/293.86

[56] References Cited

UNITED STATES PATENTS 3,466,316  9/1969  Payne, Jr. et al..................260/465.4
3,625,987  12/1971  Hubele..............................260/465 D Primary Examiner—Henry R. Jiles
Assistant Examiner—G. Thomas Todd
Attorney—Karl F. Jorda et al.

[57] ABSTRACT

New basically substituted 1-cyano-O-carbamoyl-formoximes are described as insecticides, acaricides and nematocides, which are distinguished from known carbamoyl-oximes by pronounced systemic insecticidal, acaricidal and nematocidal action. A typical compound is 1-diethylamino-O-(N'-methylcarbamoyl)-formoxime. Processes for the production of these compounds are described as well as pesticidal compositions containing these compounds as active substances.

2 Claims, No Drawings

1-PIPERIDINE-1-CYANO-0-CARBAMOYL-FORMOXIMES

This is a division of application Ser. No. 844,163, filed on July 23, 1969 now U.S. Pat. No. 3,673,236.

DETAILED DESCRIPTION

The present invention concerns new carbamoyl-formoximes, namely 1-cyano-0-carbamoyl-formoximes having a basic group in 1-position, process for the production thereof, pesticidal agents containing these new compounds as active substance, as well as methods for the control of pests using the new active substances or agents containing them.

In the South African Pat. No. 66/6759, a number of carbamoyl-oximes of aliphatic aldehydes have already been suggested as insecticidal, acaricidal and nematocidal active substances. In French Pat. No. 1,498,899 1-cyano-1-alkylthio-0-carbamoyl-formoximes, among others, are described therein. This group of active substances, however does not possess any or only insufficient systemic insecticidal properties. Individual members of this group are, moreover, phytotoxic and toxic for warm-blooded animals.

The compounds of the present invention are basically substituted 1-cyano-0-carbamoyl-formoximes of the Formula I:

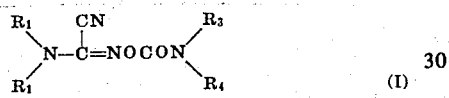

(I)

wherein
$R_1$ represents hydrogen, a substituted or unsubstituted lower alkyl radical with 1 to 5 carbon atoms,
$R_2$ represents a lower alkyl radical with 1 to 5 carbon atoms, a cycloalkyl radical with 3 to 6 carbon atoms, the phenyl radical, the tetrahydrofuryl radical, or
$R_1$ and $R_2$ together with the adjacent nitrogen atom represent a 5- or 6-membered heterocyclic radical,
$R_3$ represents hydrogen or a lower alkyl radical with 1 to 5 carbon atoms and
$R_4$ represents a lower alkyl or alkenyl radical with 1 to 5 carbon atoms or 2 to 4 carbon atoms, respectively.

Examples of lower alkyl radicals represented by $R_1$ to $R_4$ having 1 to 5 carbon atoms, are methyl, ethyl, n-propyl, isopropyl, n-butyl, tert-butyl, isobutyl and pentyl radicals. Examples of lower alkenyl radicals $R_4$ are the allyl, methallyl or propenyl radical. Cycloalkyl radicals $R_2$ are preferably monocyclic radicals such as cyclopropyl, 1-methylcyclopropyl, cyclobutyl, cyclopentyl and cyclohexyl. Substituted alkyl radicals contain, for example, the following substituents: hydroxy, halogen, lower alkoxy, alkylthio, alkylamino, dialkylamino, whereby alkyl always represents lower alkyl of from 1 to 5 carbon atoms.

A 5- or 6-membered heterocyclic radical formed by $R_1$ and $R_2$ and the adjacent nitrogen atom is preferably saturated and can contain other hetero atoms such as another nitrogen atom or oxygen atom. These heterocyclic radicals can also contain substituents such as lower alkyl, lower alkoxycarbonyl, etc. Preferred heterocyclic radicals are: the piperidino, piperazino, 4-methylpiperazino, 4-alkoxycarbonyl-piperazino or the morpho-lino radical.

The novel 1-cyano-0-carbamoyl-formoximes of the Formula I are produced according to the invention by reacting a 1-cyano-formoxime of the Formula II:

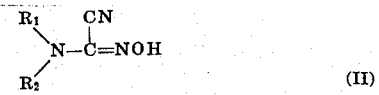

(II)

either
a. with an isocyanate of the Formula III:

$$R_4NCO \quad (III)$$

or
b. with a carbamic acid halide of the Formula IV:

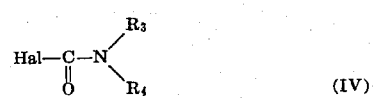

(IV)

wherein
Hal represents chlorine or bromine,
or
c. with the components forming the carbamic acid halide of Formula IV, namely with phosgene and an amine of the Formula V:

(V)

preferably in the presence of an acid-binding agent and a solvent or diluent which is inert towards the reaction components. In the Formulas II to V, the symbols $R_1$ to $R_4$ have the meanings given for Formula I.

For the production of the novel 1-cyano-0-carbamoyl-formoximes of Formula I in which $R_3$ represents hydrogen, a mixture of an isocyanate of Formula III and an N-mono-alkyl-carbamic acid halide of the formula

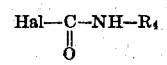

can also be used.

The reactions according to the invention are performed in the presence of acid-binding agents such as inorganic bases, e.g. hydroxides, oxides and carbonates of alkali and alkaline earth metals, and organic nitrogen bases, for example tertiary amines such as pyridine, triethylamine, triethylene-diamine, etc., as well as organotin compounds. The reactions are carried out in the presence of solvents and diluents which are inert towards the reaction components, e.g. in ethers and ether-type compounds such as diethylether, propyl ethers, dioxane; ketones such as acetone, methylethyl ketone; amides such as N,N-alkylated carboxylic acid amides; in halogenated hydrocarbons or aliphatic and aromatic hydrocarbons. The novel carbamoyl oximes are obtained according to the invention in good to very good yields. They are soluble in the usual organic solvents and water and are stable. Some of the starting materials of Formula II used for the reactions according to the invention are known. The compounds which have not previously been described can be obtained according to the method described by W. Steinkopf et al.,

[J.pr.Chemie (2), 83, 453–470 (1911)], by reacting 1-chloro-1-cyano-formoxime with primary and secondary amines.

It is known that oximes can exist in two stereoisomeric forms, the syn- and the anti-form. The 1-cyano-0-carbamoyl-formoximes of Formula I can also exist in these two forms. For this reason the term "1-cyano-0-carbamoyl-formoximes of Formula I" should be understood to represent both of these stereoisomeric forms.

The following examples illustrate the process according to the invention. The temperatures are given in degrees centigrade and all parts and percentages are by weight unless otherwise specified.

EXAMPLE 1 a. 200 ml of a 33 percent solution of dimethyl amine in absolute ethanol are added to 500 ml of dioxane and then 24 g of 1-chloro-1-cyano-formoxime in 100 ml of absolute dioxane are added dropwise with vigorous stirring under an atmosphere of nitrogen. The temperature rises to 40° and a precipitate of dimethylamine-hydrochloride is formed. Stirring is continued for 16 hours at room temperature and finally for 2 hours at 60°.

The solvents are removed by suction under vacuum, the residue is dissolved in a small volume of water, acidified (pH 3–4) with phosphoric acid and extracted with diethyl ether. The ethereal extracts are dried with anhydrous sodium sulfate, and the ether is removed under vacuum. In this manner, 21.4 g of 1-dimethylamino-1-cyano-formoxime are obtained as brownish crystals having a melting point of 112°.

b. 5.3 g of 1-dimethylamino-1-cyano-formoxime are dissolved in 50 ml of dioxane, treated with 0.25 ml of triethyl amine, and 7.5 ml of methylisocyanate are added thereto. This mixture is kept for 16 hours at 40°–50. After cooling, the dioxane is removed under vacuum and the residue is recrystallized from ethanol. In this manner, 6.9 g of white crystals (m.p. 114°–117°) of 1-dimethylamino-1-cyano-0-(N'-methylcarbamoyl)-formoxime are obtained. The motor liquor yields a further 4.5 g, m.p. 112°–115°.

EXAMPLE 2

42.8 g of 1-morpholine-1-cyano-formoxime [produced analogously to Example 1a)] and 33.2 g of dimethyl-carbamic acid chloride are dissolved in 700 ml of dioxane, and then treated with 44.2 g of anhydrous potassium carbonate. The mixture is allowed to react for 16 hours at 80° with vigorous stirring in an atmosphere of nitrogen. After cooling, the solid portion is removed by filtration and the dioxane is removed by distillation in vacuum. The residue is recrystallized from water. In this manner, 39.5 g of 1-morpholino-1-cyano-0-(N'-dimethyl-carbamoyl)-formoxime, m.p. 120°–121°, are obtained.

EXAMPLE 3

9.6 g of a 50 % by weight suspension of sodium hydride in paraffin oil are diluted under nitrogen atmosphere with 100 ml of dry tetrahydrofuran. A solution of 31 g of morpholino-1-cyano-formoxime in 200 ml of dry tetrahydrofuran is added dropwise at room temperature with stirring vigorously to this suspension. Stirring is continued at 35° – 40° for 30 minutes. This mixture is then added in small portions at 0°–5° to a stirred solution of 39.6 g of phosgene in 400 ml of dry ether. Stirring is continued at room temperature for 30 minutes. The excess of phosgene is then removed in vacuo. A solution of 22.5 g of dimethylamine in 100 ml of dry tetrahydrofuran is then added dropwise at room temperature and the whole is stirred for 16 hours at room temperature. The reaction mixture is then heated to 60° for 1 hour, the solution is filtered after cooling and the solvent is removed in vacuo.

The residue is washed with hexane in order to remove the paraffin oil and then recrystallized from a water/ethanol mixture. Thus 1-morpholino-1cyano-0-(N'-dimethyl-carbamoyl)-formoxime melting at 120°–121° is obtained.

The following compounds of Formula I were produced analogously to the processes described in the Examples:

| Compounds | Melting point |
| --- | --- |
| 1-methylamino-1-cyano-0-(N'-methylcarbamoyl)-formoxime | 157°–165° |
| 1-dimethylamino-1-cyano-0-(N'-methylcarbamoyl)-formoxime | 114°–117° |
| 1-dimethylamino-1-cyano-0-(N'-dimethylcarbamoyl)-formoxime | 58°–59° |
| 1-ethylamino-1-cyano-0-(N'-methylcarbamoyl)-formoxime | 132°–142° |
| 1-diethylamino-1-cyano-0-(N'-methylcarbamoyl)-formoxime | 60° 91° |
| 1-n-propylamino-1-cyano-0-(N'-methylcarbamoyl)-formoxime | 112°–114° |
| 1-isopropylamino-1-cyano-0-(N'-methylcarbamoyl)-formoxime | 131°–136° |
| 1-n-butylamino-1-cyano-(N'-methylcarbamoyl)-form-oxime | 101°–102° |
| 1-isobutylamino-1-cyano-(N'-methylcarbamoyl)-formoxime | 133°–134° |
| 1-tert-butylamino-1-cyano-0-(N'-methylcarbamoyl)-formoxime | 109°–112° |
| 1-cyclopropylamino-1-cyano-0-(N'-methylcarbamoyl)-formoxime | 139° |
| 1-piperidino-1-cyano-0-(N'-methylcarbamoyl)-formoxime | 154° |
| 1-morpholino-1-cyano-0-(N'-methylcarbamoyl)-formoxime | 120° 168° |
| 1-morpholino-1-cyano-0-(N'-dimethylcarbamoyl)-formoxime | 120°–121° |
| 1-diethylamino-1-cyano-0-(N'-dimethylcarbamoyl)-formoxime | oil |
| 1-di-n-propylamino-1-cyano-0-(N'-methylcarbamoyl)-formoxime | oil |
| 1-anilino-1-cyano-0-(N'-methylcarbamoyl)-formoxime | 172°–174° |
| 1-piperidino-1-cyano-0-(N'-methylcarbamoyl)-formoxime | 154° |
| 1-piperazino-1-cyano-0-(N'-methylcarbamoyl)-formoxime | 202° |
| 1-(4-methyl-piperazino)-1-cyano-0-(N'-methylcarbamoyl)-formoxime | 82° |
| 1-(4-ethoxycarbonyl-piperazino)-1-cyano-(N'-methylcarbamoyl)-formoxime | 105° |
| 1-(4-ethoxycarbonyl-piperazino)-1-cyano-0-(N'-dimethylcarbamoyl)-formoxime | 137° |
| 1-dimethylamino-1-cyano-0-(N'-ethylcarbamoyl)-formoxime | 81° |
| 1-dimethylamino-1-cyano-0-(N'-isopropylcarbamoyl)-formoxime | 99° |
| 1-dimethylamino-1-cyano-0-(N'allylcarbamoyl)-formoxime | 86° |
| 1-dimethylamino-1-cyano-0-(N'-n-propylcarbamoyl)-formoxime | 74° |
| 1-morpholino-1-cyano-0-(N'-ethylcarbamoyl)-formoxime | paste |
| 1-diethylamino-1-cyano-0-(N'ethylcarbamoyl)-formoxime | oil |
| 1-tetrahydrofurfurylamino-0-(N'-methylcarbamoyl)formoxime | 121°–122° |

The production of pesticidal agents according to the invention is performed in a known manner by intimate mixing and grinding of active substances of the general Formula I together with suitable carriers, optionally with the addition of dispersing agents, absorbents, or solvents, which are inert towards the active substances. The novel active substances can be prepared in the following forms:

solid preparations: dusts, scattering agents, granulates, (coated granulates, impregnated granulates and homogeneous granulates);
   water-dispersible concentrates of the active substance: wettable powders, pastes, emulsions;
   liquid preparations: solutions, aerosols.

The concentration of active substance in these preparations is from 0.01 to 80 percent. Other biocidally active substances or agents can be admixed with the agents described according to the invention. Thus, in addition to the said active substances of the general Formula I, the new agents may contain, for example, other insecticides, fungicides, bactericides, fungistatic and bacteriostatic substances or other nematocides in order to broaden the range of action. The agents according to the invention may also contain plant fertilizers, trace elements, etc.

The novel active substances are used for soil disinfection in the form of solid or liquid agents. For soil disinfection, those agents which assure an even distribution of the active substance throughout a layer of soil 15 to 25 cm deep are especially favorable. The method and form of application are, in particular, dependent upon the type of soil pests to be controlled, the climate and the nature of the soil.

Since the novel active substances are not phytotoxic and do not adversely affect seed germination they can be used before seeding without observing a waiting time and in crops which have already been planted.

The following forms for application of the pesticides according to the invention serve to illustrate the invention; where not expressly stated otherwise, "parts and percentages" are by weight.

DUST

The following ingredients are used to produce (a) a 10 percent and (b) a 2 percent dust:

a. 10 parts of 1-n-butylamino-1-cyano-0-(N'-methylcarbamoyl)-formoxime,
   5 parts of highly dispersed silicic acid,
   85 parts of talcum;
b. 2 parts of 1-morpholino-1-cyano-0-(N'-dimethylcarbamoyl)-formoxime,
   1 part of highly dispersed silicic acid,
   97 parts of talcum.

The active substances are mixed and ground with the carriers. The dusts obtained are used, e.g., for the control of cockroaches and ants, etc. in buildings, and also for plant protection.

GRANULATE

The following ingredients are used to produce a 5 percent granulate:

5 parts of isopropylamino-1-cyano-0-(N'-methylcarba-moyl)-formoxime,
   0.25 part of epichlorohydrin,
   0.25 part of octaethyleneglycol ether,
   3.50 parts of polyethyleneglycol of a molecular weight of about 400,
   91 parts of kaolin (particle size 0.3–0.8 mm).

The active ingredient is mixed with epichlorohydrin and then dissolved in 6 parts of acetone, and the polyethyleneglycol and octaethyleneglycol ether are added thereto. The solution obtained is sprayed onto kaolin and then the acetone is evaporated in vacuo. The granulate obtained is suitable for the protection of plants and stored goods.

WETTABLE POWDER

For the production of a 50 percent [(a) and (b)], a 25 percent [(c)], and a 10 percent [(d)] wettable powder, the following components are used:

a. 50 parts of 1-dimethylamino-1-cyano-0-(N'-methylcarbamoyl)-formoxime,
   5 parts of naphthalene sulfonic acid/benzene sulfonic acid/formaldehyde condensation product,
   5 parts of nonylphenyl sulfonate,
   5 parts of Champagne chalk,
   20 parts of silicic acid,
   15 parts of kaolin;
a. 50 parts of 1-diethylamino-1cyano-0-(N'-dimethylcarbamoyl)-formoxime,
   5 parts of nonylphenyl sulfonate,
   10 parts of calcium lignin sulfonate,
   1 part of Champagne chalk/hydroxyethyl cellulose mixture (1:1),
   20 parts of silicic acid,
   14 parts of kaolin;
c. 25 parts of 1-n-propylamino-1-cyano-0-(N'-methylcarbamoyl)-formoxime,
   5 parts of sodium oleyl methyl tauride,
   2.5 parts of naphthalene sulfonic acid/formaldehyde condensation product,
   0.5 part of carboxymethyl cellulose,
   5 parts of neutral potassium-aluminum silicate,
   62 parts of kaolin;
d. 10 parts of 1-n-butylamino-1-cyano-0-(N'-methylcarbamoyl)-formoxime,
   3 parts of a mixture of the sodium salts of saturated fatty alcohol sulfates,
   5 parts of naphthalene sulfonic acid/formaldehyde condensation product,
   82 parts of kaolin.

The active ingredients are intimately mixed with the additives in suitable mixers and ground in mills and rollers. Wettable powders are obtained which can be diluted with water to form suspensions of any desired concentration. Such suspensions are used primarily in plant protection for the control of biting and sucking insects.

PASTE

The following ingredients are used to produce a 45 percent paste:

45 parts of 1-diethylamino-1cyano-0-(N'-methylcarbamoyl)-formoxime,
   5 parts of sodium aluminum silicate
   15 parts of cetyl octaethylene glycol ether
   2 parts of spindle oil,
   10 parts of polyethyleneglycol of a molecular weight of about 400,
   23 parts of water.

The active ingredient is intimately mixed and ground with the additives in apparatus suitable therefor. A paste is obtained from which, by dilution with water, suspensions of any concentration desired can be produced. These suspensions are suitable for the control of insects in plant protection.

EMULSION

To produce a 10 percent emulsion concentrate, 10 parts of 1-morpholino-1-cyano-0-(N'-methylcarbamoyl)-formoxime,
55 parts of xylene,
32 parts of dimethyl formamide and
3 parts of an emulsifying agent consisting of nonylphenyl decaethyleneglycol and calcium nonylphenylsulfonate (weight ratio about 1:1)

are mixed together. This concentrate can be diluted with water to form emulsions having concentrations suitable for the protection of plants and stored goods.

SPRAY a. 1 part of 1-methylamino-1-cyano-0-(N'-methylcarbamoyl)-formoxime are dissolved in 99 parts of water;
b. 2 parts of 1-dimethylamino-1-cyano-0-(N'-methylcarbamoyl)-formoxime are dissolved in 10 parts of xylene and 88 parts of petroleum;
c. 2 parts of 1-diethylamino-1-cyano-0-(N'-methylcarbamoyl)-formoxime and 3 parts of dichlorophenyl-trichloroethane are dissolved in 95 parts of kerosene.

These solutions are sprayed with pressure sprayers. The solution (a) is advantageously used for the control of leaf aphids on fruit trees and other plants. The solutions (b) and (c) are used in particular for the control of flies and mosquitoes in buildings, storerooms and slaughter houses.

Insecticidal and acaricidal tests with the compounds of Formula I have shown that the novel 1-cyano-0-carbamoyl-formoximes have a very good systemic insecticidal action; in addition, they are good to very good stomach and contact poisons. Tests of their action were made with insects of the families Muscidae, Stomoxidae and Culicidae, e.g. with polyvalent resistant and normally sensitive house flies (*Musca domestica*), stable flies (*Stomoxys calcitrans*) and mosquitoes (e.g. *Aedes Aegypti, Culex fatigans, Anopheles stephensi*); with insects of the families Curculionidae, Bruchididae, Dermestidae, Tenebrionidae and Chrysomelidae, e.g. granary weevils (*Sitophilus granarius*), bean beetles (*Bruchidus obtectus*), larder beetles (*Dermestes vulpinus*), yellow meal worms (*Tenebrio molitor*), Colorado potato beetles (*Leptinotarsa decemlineata*) and their stages of development; with insects of the family Pyralididae, e.g. Mediterranean flour moths (*Ephestia kühniella*), as well as of the family Blattidae, e.g. Cockroaches (*Phyllodromia germanica, Periplaneta americana, Blatta orientalis*), the family Aphididae e.g. bean aphids (*Aphis fabae*); in addition, with insects of the family Pseudococcidae, e.g. citrus mealybugs (*Planococcus citri*) and of the family Locustidae, such as migratory locusts (*Locusta migratoria*). The tests on the said bean aphids, citrus mealybugs and migratory locusts demonstrate a systemic action.

In addition, the active substances of the Formula I according to the invention have a good action on the larval and adult stages of spiders, e.g. of the families Acarinae, Ixodidae, Arachnidae and Argasidae.

Furthermore the active substances of Formula I have excellent nematocidal and soil-fungicidal properties.

In admixture with synergists such as succinic acid dibutyl ester, piperonyl butoxide, and auxiliaries having a similar action such as olive oil, peanut oil, etc., the range of action of the active substances according to the invention is broadened and, in particular, the insecticidal and acaricidal action is improved. In the same way, the insecticidal action can be substantially broadened and adapted to the prevailing circumstances by the addition of other insecticides such as phosphoric, thiophosphoric and dithiophosphoric acid esters and amides, carbamic acid esters, halogenated hydrocarbons and analogues of DDT active substance, as well as pyrethrins and synergists thereof.

SYSTEMIC INSECTICIDAL ACTION

In order to determine the systemic action of the new compounds, cabbage, tomato and horsebean plants in flower pots containing 600 cc of humus are watered with 50 ml of an aqueous emulsion containing 0.48 percent of active substance (prepared from a 10 percent emulsion concentrate).

After 24 hours the parts of the plants above ground are infested with the test animals. Ten Desert locusts (*Locusta migratoria*, 3rd stage) are placed on each cabbage plant, 10 citrus mealybugs (*Pseudococcus citri*) on each tomato plant, and ten bean aphids (*Aphis fabae*) on each horsebean plant. All tests are duplicated. The time elapsing until all insects are in dorsal position is determined. (Test period 3 days, ambient temperature 25°–30°).

| a) Tests with *Locusta migratoria* (3rd stage) active substance | time elapsed (in hours) until 100% in dorsal position |
|---|---|
| 1-diethylamino-1-cyano-0-(N'-methylcarbamoyl)-formoxime | 24 |
| 1-isopropylamino-1-cyano-0-(N'-methylcarbamoyl)-formoxime | 48 |
| 1-piperidino-1-cyano-0-(N'-methylcarbamoyl)-formoxime | 72 |
| 1-morpholino--cyano-0-(N'-methylcarbamoyl)-formoxime | 24 |
| 1-methylthio-1-cyano-0-(N-methylcarbamoyl)-formoxime (known from South African Pat. No. 66/6759 or the French Pat. No. 1,498,899) | no effect |

| b) Tests with *Pseudococcus citri* active substance | time elapsed (in hours) until 100% in dorsal position |
|---|---|
| 1-morpholino-1-cyano-(N'-methylcarbamoyl)-formoxime | 24 |
| 1-isopropylamino-1-cyano-0-(N'-methylcarbamoyl)-formoxime | 72 |
| 1-methylthio-1-cyano-0-(N-methylcarbamoyl)-formoxime (known from South African Pat. No. 66/6759 or the French Pat. No. 1,498,899 ) | no effect |

| c) Tests with *Aphis fabae* active substance | time elapsed (in hours) until 100% in dorsal position |
|---|---|
| 1-diethylamino-1-cyano-0-(N'-methylcarbamoyl)-formoxime | 24 |
| 1-n-propylamino-1cyano-0-(N'-methylcarbamoyl)-formoxime | 24 |

| Active substance | |
|---|---|
| 1-isopropylamino-1-cyano-0-(N'-methylcarbamoyl)-formoxime | 24 |
| 1-n-butylamino-1-cyano-0-(N'-methylcarbamoyl)-formoxime | 24 |
| 1-morpholino-1-cyano-0-(N'-methylcarbamoyl)-formoxime | 24 |
| 1-morpholino-1-cyano-0-(N', N'-dimethyl)-formoxime | 24 |
| 1-piperidino-1-cyano-0-(N'-methylcarbamoyl)-formoxime | 24 |
| 1-methylthio-1-cyano-0-(N-methylcarbamoyl)-formoxime (known from South African Pat. No. 66/6759 or the French Pat. No. 1,498,899) | no effect |

STOMACH POISON TEST

In order to determine the action of the new compounds as stomach poison, cabbage and potato plants in flower pots are sprayed until completely wet with an aqueous emulsion containing 0.05 percent of active substance (prepared from a 10 percent emulsion concentrate). For a first test a third of the treated plants are used. After 1 hour ten Colorado beetle larvae (*Leptinotarsa decemlineata*, 3rd stage) are placed on each potato plant, and five desert locusts (*Locusta migratoria*, 3rd stage) are placed on each cabbage plant. The test is repeated with the second and third portions of the treated plants after 3 and 8 days, respectively. All tests are duplicated. The time elapsing until all insects are in dorsal position is determined. (Test period 2 days, ambient temperature 25°–30°).

a) Tests with Leptinotarsa decemlineata (3rd stage)
Time elapsed (in hours) until 100% in dorsal poisition, when plants have been infected by insects after

| Active substance | 1 hour | 3 days | 8 days |
|---|---|---|---|
| 1-piperidino-1-cyano-O-(N'-methylcarbamoyl)-formoxime | 24 | 24 | 24 |
| 1-morpholino-1-cyano-O-(N'-methylcarbamoyl)-formoxime | 48 | 48 | 48 |
| 1-methylthio-1-cyano-0-(N-methylcarbamoyl)-formoxime (known from South African Pat. No. 66/6759 or the French Pat. No. 1,498,899 | no effect | no effect | no effect | b) Tests with Locusta migratoria (3rd stage)
Time elapsed (in hours) until 100% in dorsal position, when plants have been infected by insects after

| active substance | 1 hour | 3 days | 8 days |
|---|---|---|---|
| 1-diethylamino-1-cyano-O-(N'-methylcarbamoyl)-formoxime | 24 | 48 | 48 |
| 1-morpholino-1-cyano-O-(N'-methylcarbamoyl)-formoxime | 24 | 24 | 24 |
| 1-piperidino-1-cyano-O-(N'-methylcarbamoyl)-formoxime | 24 | 48 | 48 |
| 1-methylthio-1-cyano-O-(N-methylcarbamoyl)-formoxime (known from South African Pat. No. 66/6759 or the French Pat. No. 1,498,899 | no effect | no effect | no effect |

CONTACT POISON TEST a. Tests with cotton stainers (*Dysdercus fasciatus*)

In order to determine the action as contact poison of the new compounds, cotton plants in flower pots are sprayed until completely wet with an aqueous emulsion containing 0.025 percent of active substance (prepared from a 10 percent emulsion concentrate). After 1 hour, the plants are infested with 10 adult cotton stainers each. All tests are duplicated. The time elapsing until all insects are in dorsal position is determined. (Test period 2 days, ambient temperature 25°–30°).

| active substance | Time elapsed (in hours) until 100% in dorsal position |
|---|---|
| 1-diethylamino-1-cyano-0-(N'-methylcarbamoyl)-formoxime | 24 |
| 1-di-n-propylamino-1-cyano-0-(N'-methylcarbamoyl)-formoxime | 24 |
| 1-tert-butylamino-1-cyano-0-(N'-methylcarbamoyl)-formoxime | 24 |
| 1-piperidino-1-cyano-0-(N'-methylcarbamoyl)-formoxime | 24 |
| 1-methylthio-1-cyano-0-(N-methylcarbamoyl)-formoxime (known from South African Pat. No. 66/6759 or the French Pat. No. 1,498,899) | no effect | b. Tests with citrus mealybugs (*Pseudococcus citri*)

Tomato plants infested with citrus mealybugs are sprayed until completely wet with an aqueous emulsion containing 0.025 percent of active substance (prepared from a 10 percent emulsion concentrate). All tests are duplicated. The time elapsing until all insects are in dorsal position is determined. (Test period 2 days, ambient temperature 25°–30°.)

| active substance | Time elapsed (in hours) until 100% in dorsal position |
|---|---|
| 1-diethylamino-1cyano-0-(N'-methylcarbamoyl)-formoxime | 24 |
| 1-isopropylamino-1-cyano-0-(N'-methylcarbamoyl)-formoxime | 48 |
| 1-methylthio-1-cyano-0-(N-methylcarbamoyl)-formoxime (known from South African Pat. No. 66/6759 or the French Pat. No. 1,498,899 | no effect |

ACARICIDAL ACTION ON *TETRANYCHUS URTICAE*

In order to determine the acaricidal properties of the new compounds, a test is carried out with bean leaves infested with adults, quiescent stages and eggs of the red spider mite (Tetranychus urticae). The bean leaves are treated until completely wet with aqueous emulsions in concentrations of 0.1 and 0.05 percent of active substance (prepared from a 25 percent emulsion concentrate). The concentrations of active substance used which lead to 100 percent mortality after 6 days are determined.

Red spider mites which are resistant to phosphoric acid esters are used as test animals. The test results are given in the following table.

| active substance | Concentrations (in %) of active substance leading to 100% mortality after 6 days | | |
|---|---|---|---|
| | adults | quiescent stages | eggs |
| 1-diethylamino-1-cyano-0-(N'-methylcarbamoyl)-formoxime | 0.05 | 0.05 | 0.05 |
| 1-morpholino-1-cyano-0-(N'-methylcarbamoyl)-formoxime | 0.05 | 0.05 | 0.1 |
| 1-methylthio-1-cyano-0-(N-methylcarbamoyl)-formoxime (known from South African Pat. No. 66/6759 or the French Pat. No. 1,498,899) | 0.1 | no effect | no effect at 0.1 |

NEMATOCIDAL ACTION ON *MELOIDOGYNE ARENARIA*

The amount of active substance calculated to give concentrations for application of 0.02, 0.01, 0.005 and 0.0025 percent is thoroughly mixed with sand and subsequently mixed with humus, infested with *Meloidogyne arenaria*. Tomato seedlings are immediately planted in the fresh humus prepared as described above. Part of the prepared humus is stored for 8 days, and then used for planting more tomato seedlings. After a test period of 28 days the number of root knots is determined. The minimum concentration of active substance preventing the formation of root knots is given in the table.

| active substance | effective concentration in % tomato seedlings planted on the | |
|---|---|---|
| | 1st day | 8th day |
| 1-dimethylamino-1cyano-0-(N'-methylcarbamoyl)-formoxime | 0.005 | 0.0025 |
| 1-diethylamino-1-cyano-0-(N'-methylcarbamoyl)-formoxime | 0.001 | 0.001 |
| 1-morpholino-1-cyano-0-(N'-methylcarbamoyl)-formoxime | 0.005 | 0.005 |
| 1-piperidino-1-cyano-0-(N'-methylcarbamoyl)-formoxime | 0.001 | 0.001 |
| 1-tert-butylamino-1-cyano-0-(N'-methylcarbamoyl)-formoxime | 0.001 | 0.001 |
| 1-tetrahydrofurfurylamino-1-cyano-0-(N'-methylcarbamoyl)-formoxime | 0.005 | 0.005 |
| 1-cyclohexylamino-1-cyano-0-(N'-methylcarbamoyl)-formoxime | 0.005 | 0.005 |
| 1-piperidino-1-cyano-0-(N'-methylcarbamoyl)-formoxime | 0.001 | 0.001 |
| 1-methylthio-1-cyano-0-(N-methylcarbamoyl)-formoxime (known from South African Pat. No. 66/6759 or the French Pat. No. 1,498,899) | 0.02 | 0.02 |

ACUTE TOXICITY ($LD_{50}$ p.o. Rat)

The test compound was applied as a single dosis to the rats of the strain Wistar CFE, of both sexes, having a medium weight of 120–170 g. For each dose level five animals were used. The rate were observed for 1 week after the administration of the test compounds and the number of deaths per dose level was determined.

The $LD_{50}$ was determined by graphic interpolation from two doses actually administered, one of which killed less, the other more than half the number of animals treated. The results are given in the table below.

| active substance | $LD_{50}$ p.o. rat in mg/kg |
|---|---|
| 1-methylamino-1-cyano-0-(N'-methylcarbamoyl)-formoxime | 298 |
| 1-dimethylamino-1-cyano-0-(N'-methylcarbamoyl)-formoxime | 111 |
| 1-di-n-propylamino-1cyano-0-(N'-methylcarbamoyl)-formoxime | 111 |
| 1-n-butylamino-1-cyano-0-(N'-methylcarbamoyl)-formoxime | 535 |
| 1-tetrahydrofurfurylamino-1-cyano-0-(N'-methylcarbamoyl)-formoxime | 375 |
| 1-methylthio-1-cyano-0-(N'-methylcarbamoyl)-formoxime (known from the South African Pat. No. 66/6759 or the French Pat. No. 1,498,899) | 52 |

We claim:

1. A basically substituted 1-cyano-0-carbamoyl-formoxime of the Formula I

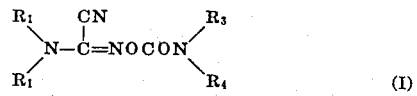

wherein $R_1$ and $R_2$ together with the adjacent nitrogen atom represent a piperidino radical, $R_3$ represents hydrogen or a lower alkyl radical with 1 to 5 carbon atoms and $R_4$ represents a lower alkyl or alkenyl radical with 1 to 5 carbon atoms or 2 to 4 carbon atoms, respectively.

2. A compound as defined in claim 1 which is 1-piperidino-1-cyano-0-(N'-methylcarbamoyl)-formoxime.

* * * * *